United States Patent [19]

Henmi et al.

[11] Patent Number: 5,084,856
[45] Date of Patent: Jan. 28, 1992

[54] CUTTING APPARATUS FOR AN OPTICAL DISC

[75] Inventors: Fumiaki Henmi; Koichi Nakajima, both of Kanagawa, Japan

[73] Assignee: Sony Corporation, Tokyo, Japan

[21] Appl. No.: 571,152

[22] Filed: Aug. 23, 1990

[30] Foreign Application Priority Data

Aug. 28, 1989 [JP] Japan .................................. 1-221019

[51] Int. Cl.$^5$ ........................ G11B 7/00; G11B 3/70
[52] U.S. Cl. ................................... 369/116; 369/111; 369/278; 369/109
[58] Field of Search ............... 369/107, 109, 111, 116, 369/278, 275.4

[56] References Cited

U.S. PATENT DOCUMENTS

| 4,114,180 | 9/1978 | Kayanuma . | |
|---|---|---|---|
| 4,516,235 | 5/1985 | Tarzaiski . | |
| 4,562,567 | 12/1985 | Frankfort et al. | 369/109 X |
| 4,692,606 | 9/1987 | Salca et al. | 369/116 X |
| 4,759,007 | 7/1988 | Eboly | 369/51 X |
| 4,807,214 | 2/1989 | Getseuer | 369/275.4 X |
| 4,949,331 | 8/1990 | Maeda et al. | 369/109 X |

FOREIGN PATENT DOCUMENTS 0107295  5/1984  European Pat. Off. .
0118936  9/1984  European Pat. Off. .
0289260 11/1988  European Pat. Off. .

Primary Examiner—Robert L. Richardson
Assistant Examiner—Nabil Hindi
Attorney, Agent, or Firm—Ronald P. Kananen

[57] ABSTRACT

A cutting apparatus is provided, in which a recording laser beam from a laser light source is ON/OFF-modulated by an optical modulating device on the basis of a square output signal in which a video FM wave signal is pulse width modulated by an audio FM wave signal thereby to form exposure pits on a master disc. This cutting apparatus includes a photodetector for receiving one portion of the recording laser beam irradiated on the master disc from the laser light source or a photodetector for receiving a reflected light of the recording laser beam irradiated on the master disc from the laser light source and which is reflected on the master disc. A detected output signal from the photodetector is supplied through a low-pass filter to a control circuit which controls an intensity of an output laser beam from the laser light source, and an offset of a source system line is adjusted so that a secondary higher harmonic component of a main carrier in the detected output from the photodetector is minimized.

25 Claims, 14 Drawing Sheets

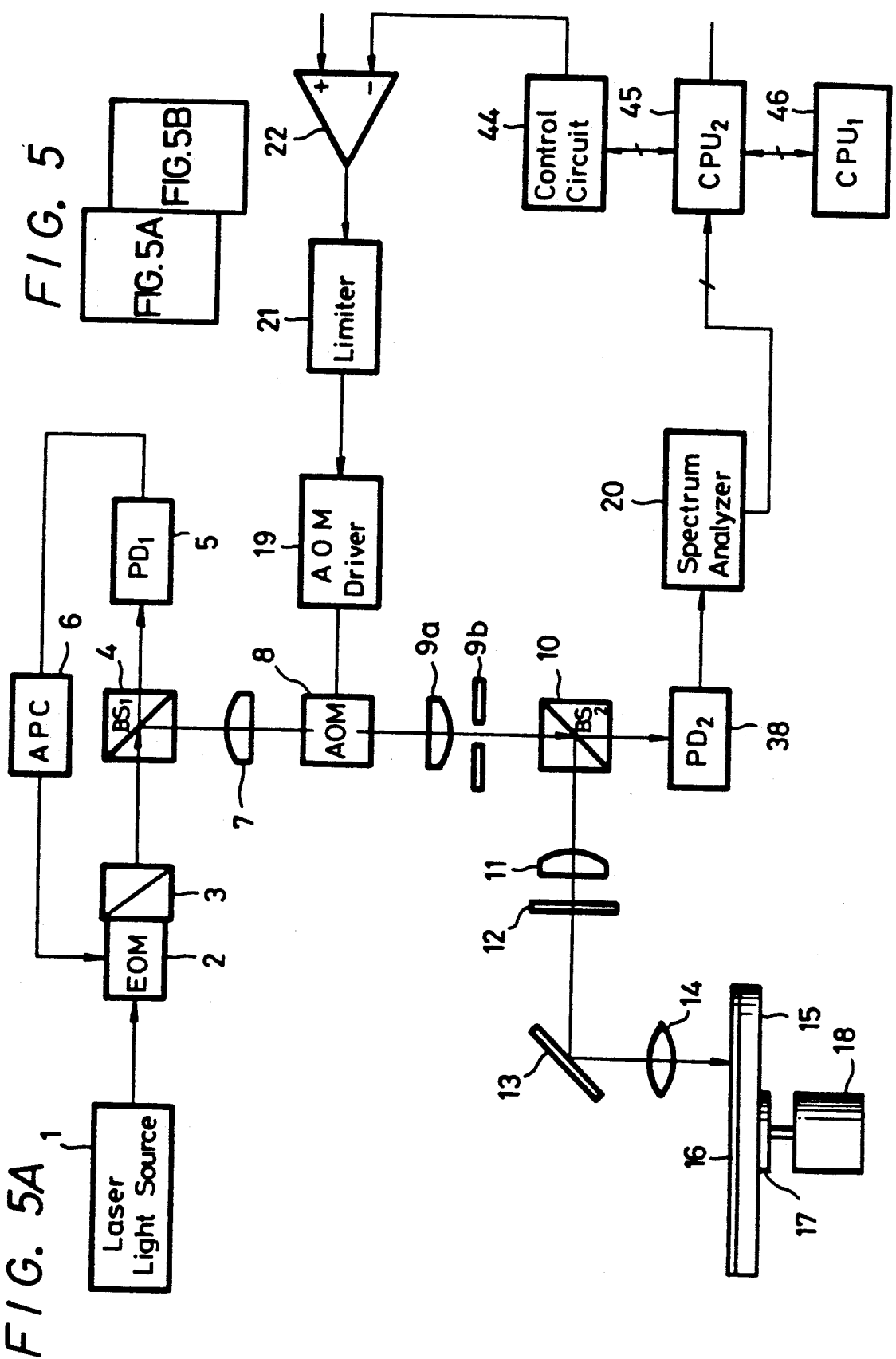

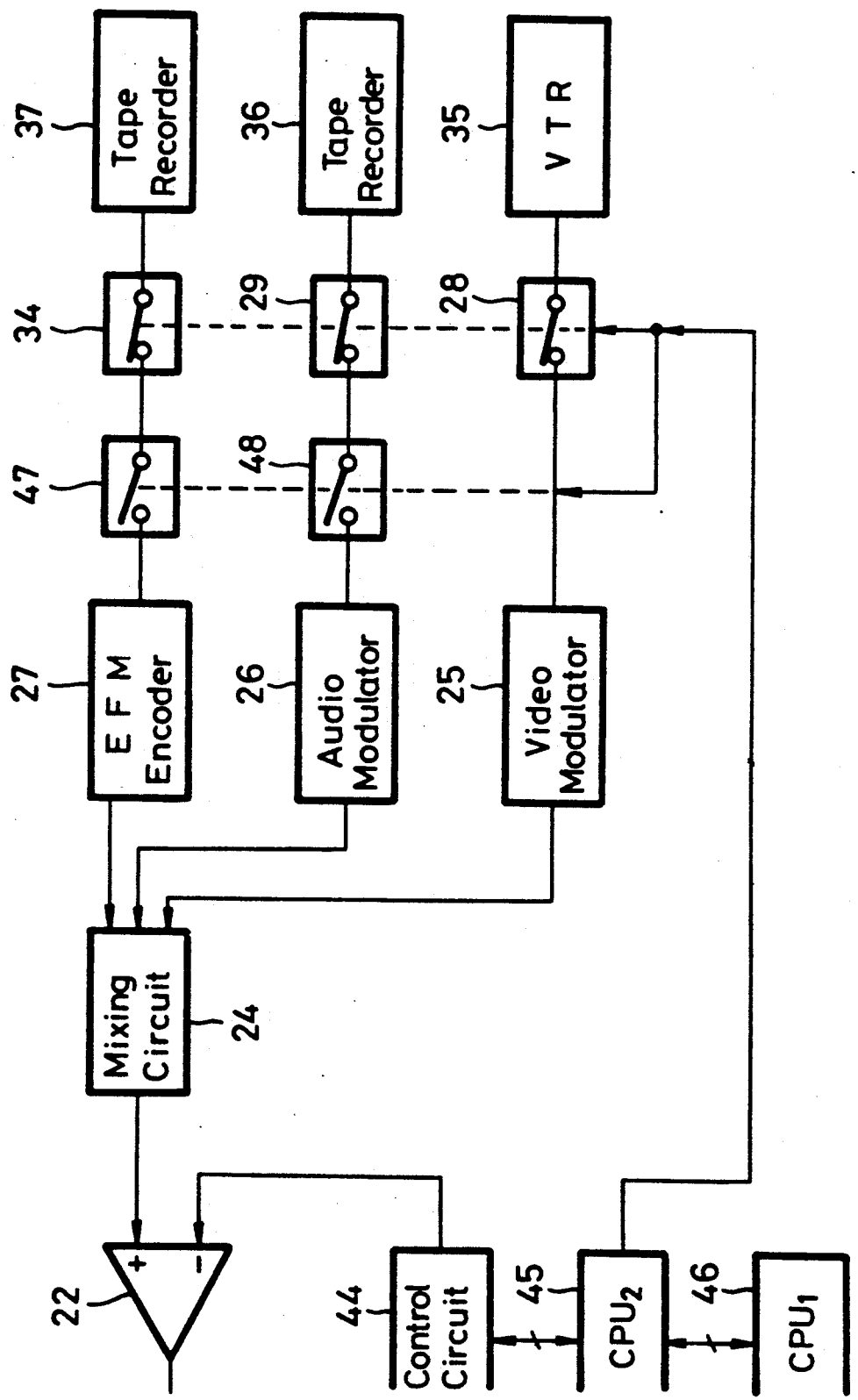

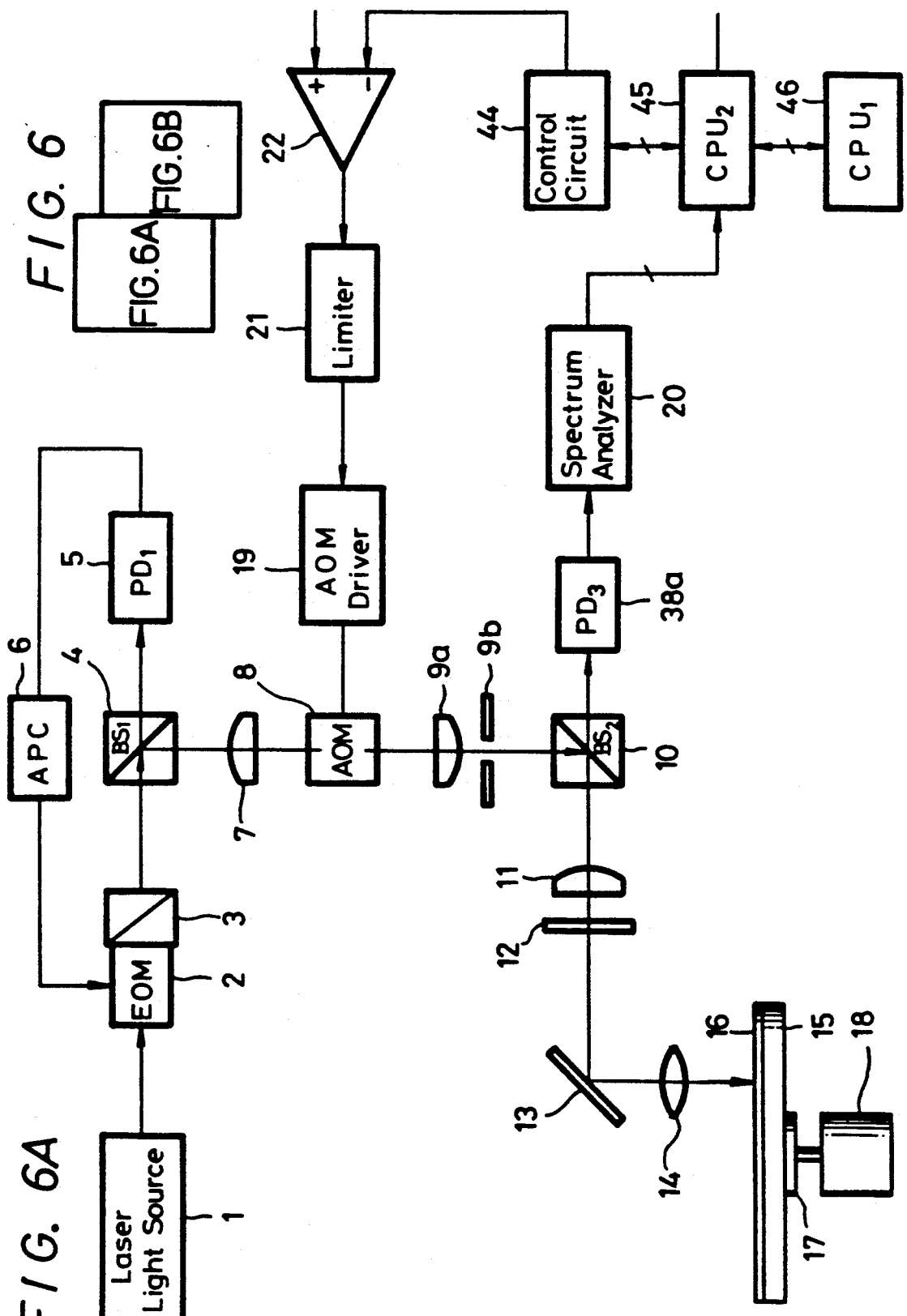

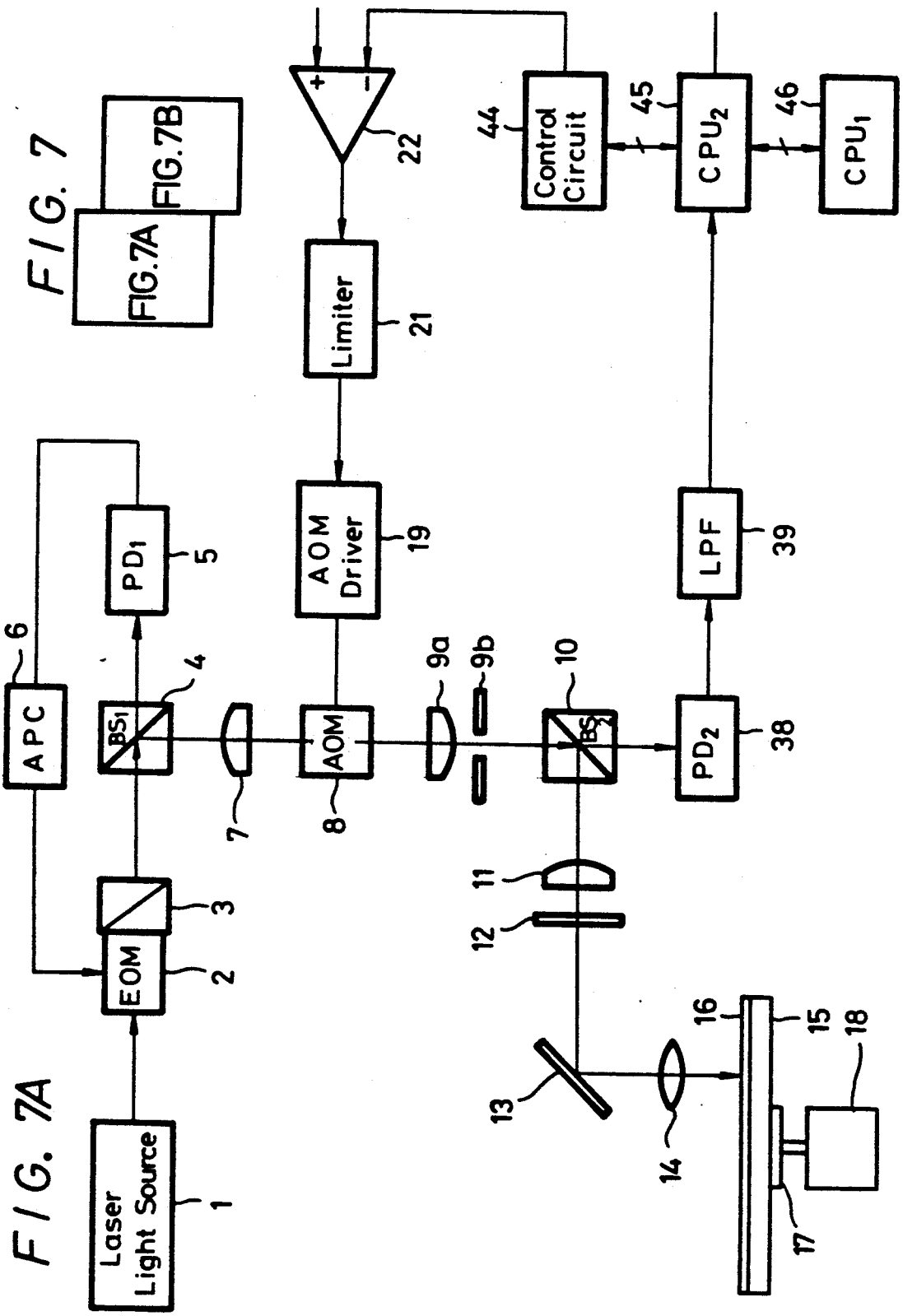

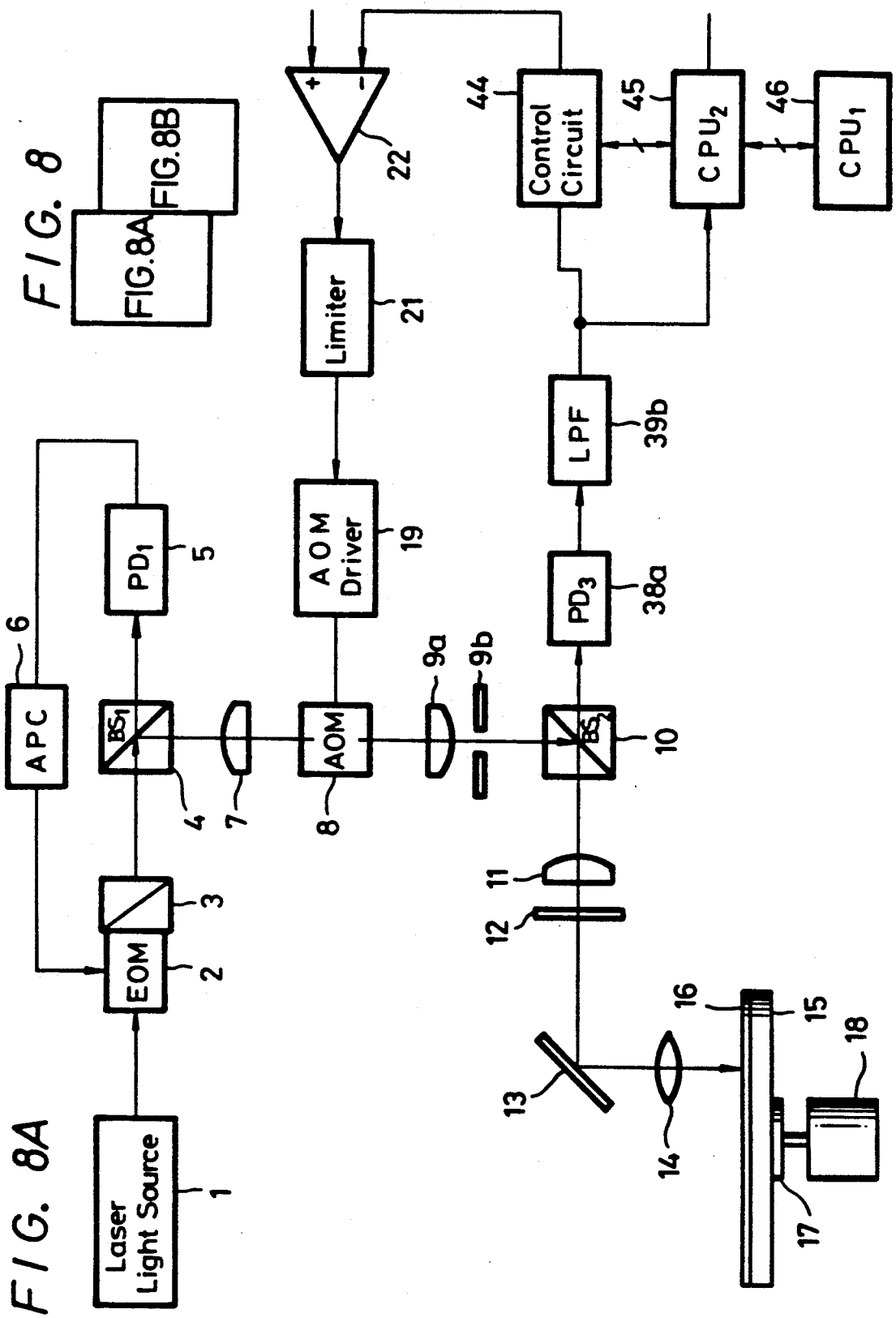

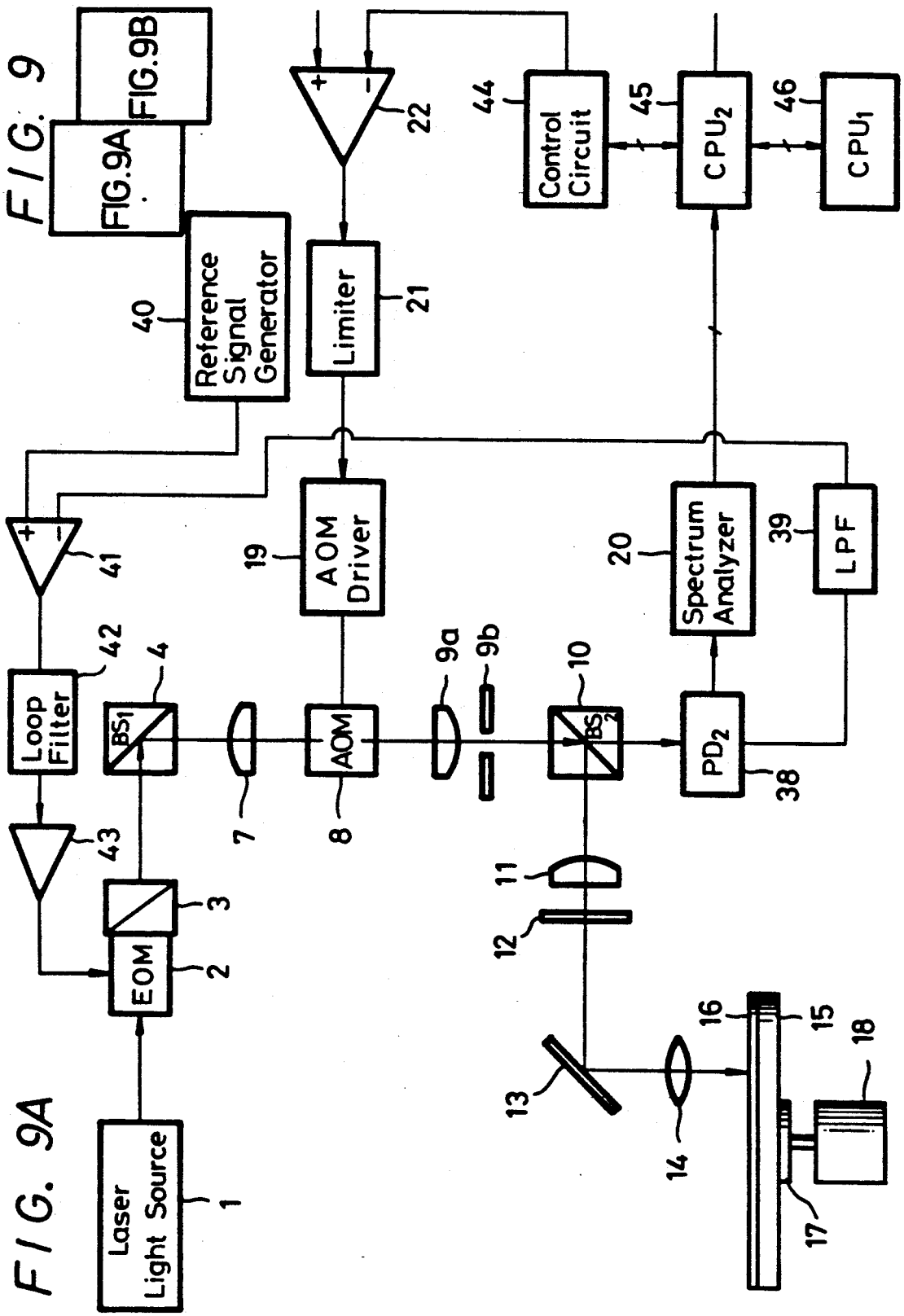

CUTTING APPARATUS FOR AN OPTICAL DISC

BACKGROUND OF THE INVENTION

1. Field of the Invention

The present invention generally relates to cutting apparatus for an optical disc and more particularly to a cutting apparatus for an optical disc in which a master disc of a video disc is provided by using a laser light source.

2. Description of the Prior Art

Video and audio signals are recorded on a prior-art video disc as shown by a frequency allocation of FIG. 1.

As shown in FIG. 1, a video signal and a 2-channel audio signal are modulated to provide FM signals by FM modulators (not shown). More specifically, the video signal is FM-modulated to provide a video FM carrier signal 30 having a central frequency of 8.5 MHz (frequency deviation is 1.7 MHz), and the stereo 2-channel audio signal is FM-modulated to provide a first channel audio FM carrier signal having a central frequency of 2.3 MHz and a second channel audio FM signal (referred to hereinafter as an analog audio signal) 31 having a central frequency of 2.8 MHz (frequency deviation is in a range of ±100 kHz). Further, the 2-channel audio signal is pulse code modulated (PCM-modulated) by 16 bits to provide an eight-to-fourteen modulation (EFM)-coded digital audio signal 33. This digital audio signal 33 is inserted into the low band region lower than 2 MHz as shown in FIG. 1.

FIG. 2 shows a systematic block diagram of a prior-art cutting apparatus in which the above-mentioned video and audio signals are recorded on a photoresist coated on a glass master disc.

Referring to FIG. 2, a video signal to be recorded is recorded by a video tape recorder (i.e., VTR) 35 and the audio signal is recorded by a tape recorder 36 or the like in a similar fashion. The video signal is supplied from the VTR 35 through a switch 28 to a video modulator 25 provided within a video signal processing circuit, in which it is FM-modulated. The first 2-channel audio signal is also supplied from the tape recorder 36 through a switch 29 to an audio modulator 26 provided within an audio processing circuit, thereby being FM-modulated. The video FM-modulated wave from the video modulator 25 and the audio FM-modulated wave from the audio modulator 26 are supplied to a mixing circuit 24.

A second audio signal is recorded by a tape recorder 37 and is supplied through a switch 34 to an analog-to-digital (A/D) converter (not shown), in which it is converted into a digial audio signal. This digital audio signal is pulse code modulated (PCM-modulated) by an EFM encoder 27, filtered out in its band higher than 2 MHz by a low-pass filter (not shown), pre-emphasized in its low band by a pre-emphasizing circuit (not shown) and is mixed with the video signal and the first audio signal by the mixing circuit 24.

An output side of the mixing circuit 24 is connected to a non-inverting input terminal of an operational amplifier 22 whose inverting input terminal is connected to one end of a variable resistor 23. The other end of the variable resistor 23 is grounded, and an offset adjustment is performed by the operational amplifier 22 and the variable resistor 23. An output of the operational amplifier 22 is supplied to a limiter 21, from which it is further supplied to an acousto-optic modulator (referred to hereinafter as an AOM) driver 19 and a spectrum analyzer 20. That is, the video FM carrier signal is supplied to and observed by the spectrum analyzer 20 and the variable resistor 23 is adjusted in a manual fashion so that a secondary higher harmonic component of the main carrier may be minimized. The final output from the limiter 21 is supplied to an acousto-optic modulator (AOM) 8 as a square wave.

The AOM 8 is formed such that a voltage of frequency $f$ is applied to a piezoelectric material (e.g., $LiNbO_3$) to produce a compression wave having a sonic velocity $v$ and having a wavelength $\Lambda$ in a medium (e.g., Te glass). If this medium is used as a diffraction grating and a laser beam having a wavelength $\lambda$ is acted on the diffraction grating, then the laser beam causes Bragg scattering or Bragg reflection. This reflected and diffracted beam is changed into a voltage which drives the medium so that, if this voltage is amplitude-modulated, it is possible to obtain a modulated laser beam. For this reason, the AOM 8 is interposed in the light path of a laser beam emitted from a laser light source 1 such as an argon laser, a helium-cadmium laser or the like. A laser beam emitted from the laser light source 1 is supplied to an electro-optic modulator (referred to hereinafter as an EOM) 2. This EOM 2 is made of a uniaxial crystal such as $KH_2PO_4$ (potassium dideuterium phosphate, i.e., KDP), $NH_4H_2PO_4$ (ammonium dihydrogen phosphate, i.e., ADP) or the like. It is to be appreciated that, if an electric field is applied to this uniaxial crystal, then a difference of phase velocity proportional to electric field intensity occurs between two planes of linearly polarized waves advancing within the crystal. Therefore, if a linearly polarized light is introduced into this uniaxial crystal, such linearly polarized light becomes an elliptic polarized wave corresponding to the applied electric field. For this reason, if a spectrum analyzer 3 is provided behind this crystal or EOM 2, it is possible to obtain the amplitude-modulated laser beam. The thus amplitude-modulated laser beam is introduced into a first beam splitter (i.e., $BS_1$) 4. A first photodetector (referred to as a $PD_1$) 5 such as a photo-diode is located at the rear stage of the first beam splitter 4. The first photodetector 5 receives a laser beam derived from the first beam splitter 4, converts the same into an electrical signal and controls the electric field of the EOM 2 in association with an automatic power control (i.e., APC) circuit 6 such that the amount of laser beam passing through the first photodetector 5 may become constant. The laser beam, reflected by the first beam splitter 4, is supplied to the AOM 8 interposed between lenses 7 and 9a, in which the information signal is modulated, and introduced through an aperture 9b into a second beam splitter (i.e., $BS_2$) 10.

A laser beam, reflected by the second beam splitter 10, travels through a lens 11, a $\lambda/4$ wavelength plate 12, a mirror 13 and an objective lens 14, in that order and exposes a photoresist 16 coated on a glass master disc 15. When this exposed photoresist 16 is developed, concave and convex pits are formed, thus the master disc being constructed. Then, on the basis of this master disc, a stamper is constructed according to the nickel plating process or the electroforming process, and a disc substrate of video disc is copied by the injection molding-process by using this stamper.

The glass master disc 15 is held on and rotated by a turntable 17 which is revolved by a drive motor 18. In that case, the glass master disc 15 can be moved in the width direction thereof by a feeding mechanism (not shown).

In the prior-art cutting apparatus as described above, the automatic power control (i.e., APC) circuit 6 is controlled so that, in the cutting-process, the cutting laser beam emitted from the laser light source 1 may have a constant power corresponding to a linear velocity for a CLV (constant linear velocity) disc or that the cutting laser beam may increase its power in the outer periphery of the optical disc for a CAV (constant angular velocity) disc.

That is, the laser beam emitted from the laser light source 1 is adjusted in offset before being modulated by the ON-OFF control of the AOM 8. Because of this, when the laser beam emitted from the laser light source 1 travels through the AOM 8, this laser beam is changed very slightly due to temperature characteristic, aging change, environment factors or setting conditions with the result that the pits are not formed uniformly on the master disc 15.

In the prior-art cutting apparatus, as shown in FIG. 2, the square wave mixed by the mixing circuit 24 and amplitude-limited by the limiter 21, i.e., the repetitive frequency of the square wave in which the video FM wave signal is pulse width modulated (PWM-modulated) by the audio FM wave signal represents the video signal. From a pitch train standpoint, the higher the frequency of the video FM modulated signal becomes, the shorter the pit length becomes and the space between the pits is reduced more. The duty ratio, W/T, that is, the ratio of square wave pulse width W relative to one cycle time T of square wave, i.e., "ON"-"OFF" ratio is adjusted such that, while the final output of the limiter 21 is observed by the spectrum analyzer 20, the secondary higher harmonic component of the main carrier is minimized. Even though the output of the AOM 8 is optimized, the duty ratio of the "ON"-"OFF" modulated laser beam is not always optimized due to non-linear characteristic of the AOM 8 or the like, thus making the pit duty incorrect.

OBJECTS AND SUMMARY OF THE INVENTION

Accordingly, it is a general object of the present invention to provide an improved cutting apparatus for an optical disc in which the aforenoted shortcomings and disadvantages of the prior art can be eliminated.

More specifically, it is an object of the present invention to provide a cutting apparatus for an optical disc in which a power of a laser light source is controlled so as to compensate for fluctuation, temperature characteristics and aging change of an acousto-optic modulator, whereby uniform and stable cutting operation can always be carried out.

It is another object of the present invention to provide a cutting apparatus for an optical disc in which a duty of an ON-OFF modulated cutting laser beam is controlled so that duty of pits to be formed can be stably maintained in its optimized condition.

According to a first aspect of the present invention, a cutting apparatus is provided, in which a recording laser beam from a laser light source is turned ON/OFF by a square output signal in which a video FM wave signal is pulse width modulated by an audio FM wave signal thereby to form exposure pits on a master disc. This cutting apparatus is comprised of a photodetector for receiving one portion of the recording laser beam irradiated on the master disc from the laser light source, a low-pass filter supplied with an output signal from the photodetector, and a control circuit for controlling intensity of the laser beam from the laser light source on the basis of an output signal from the low-pass filter.

According to a second aspect of the present invention, a cutting apparatus is provided, in which a recording laser beam from a laser light source is turned ON/OFF by a square output signal in which a video FM wave signal is pulse width modulated by an audio FM wave signal thereby to form exposure pits on a master disc. This cutting apparatus is comprised of a photodetector for receiving a reflected laser beam of a recording laser beam emitted from the laser light source and which is irradiated on and reflected on the master disc, a low-pass filter supplied with an output signal from the photodetector, and a control circuit for controlling an intensity of a laser beam emitted from the laser light source on the basis of an output signal from the low-pass filter.

According to a third aspect of the present invention, a cutting apparatus is provided, in which exposure pits are formed on a master disc by an optical modulating device which turns ON/OFF a recording laser beam emitted from a laser light source in response to a square output signal in which a video FM wave signal is pulse width modulated by an audio FM wave signal. This cutting apparatus is comprised of a photodetector for receiving one portion of the recording laser beams irradiated on the master disc from the laser light source, and an adjusting device for adjusting an offset of a source modulating system line such that a secondary higher harmonic component of a main carrier in an FM video carrier signal contained in the output signal from the photodetector is minimized.

As a fourth aspect of the present invention, a cutting apparatus is provided, in which exposure pits are formed on a master disc by an optical modulating device which turns ON/OFF a recording laser beam emitted from a laser light source in response to a square output signal in which a video FM wave signal is pulse width modulated by an audio FM wave signal. This cutting apparatus is comprised of a photodetector for receiving a reflected laser beam irradiated on the master disc from the laser light source and which is reflected on the master disc, and an adjusting device for adjusting an offset of a source modulating system line so that a secondary higher harmonic component of a main carrier in an FM carrier signal in the output signal from the photodetector is minimized.

The preceding, and other objects, features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

FIGS. 5 to 9 (formed of FIGS. 5A, 5B to FIGS. 9A to 9B drawn on two sheets of drawings to permit a suitably large scale) are block diagrams showing third to seventh embodiments of the cutting apparatus for an optical disc according to the present invention, respectively.

DETAILED DESCRIPTION OF THE PREFERRED EMBODIMENTS

Figure 1:
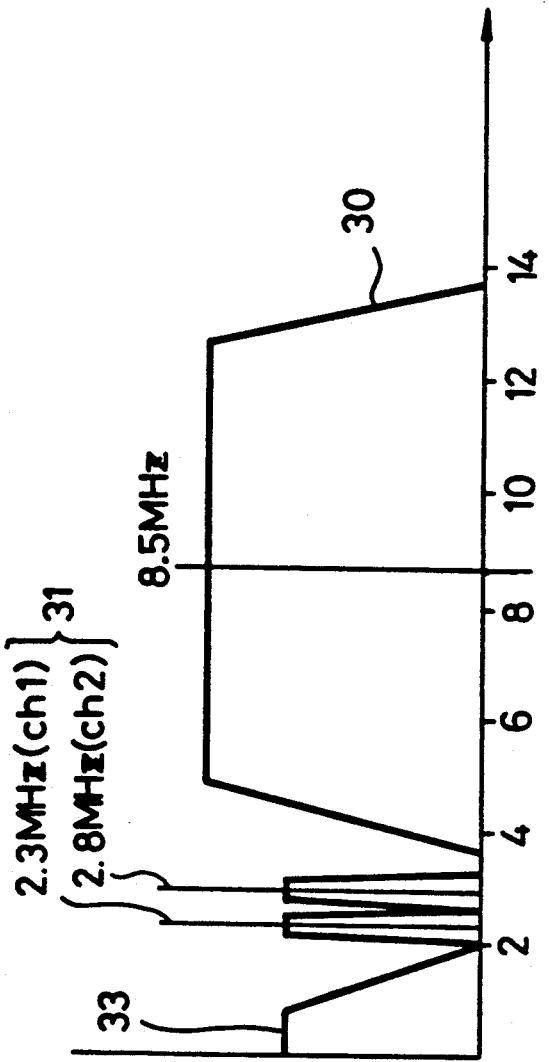
FIG. 1 is a schematic diagram of a frequency allocation, and to which reference will be made in explaining signals recorded in a video disc.
Figure 2:
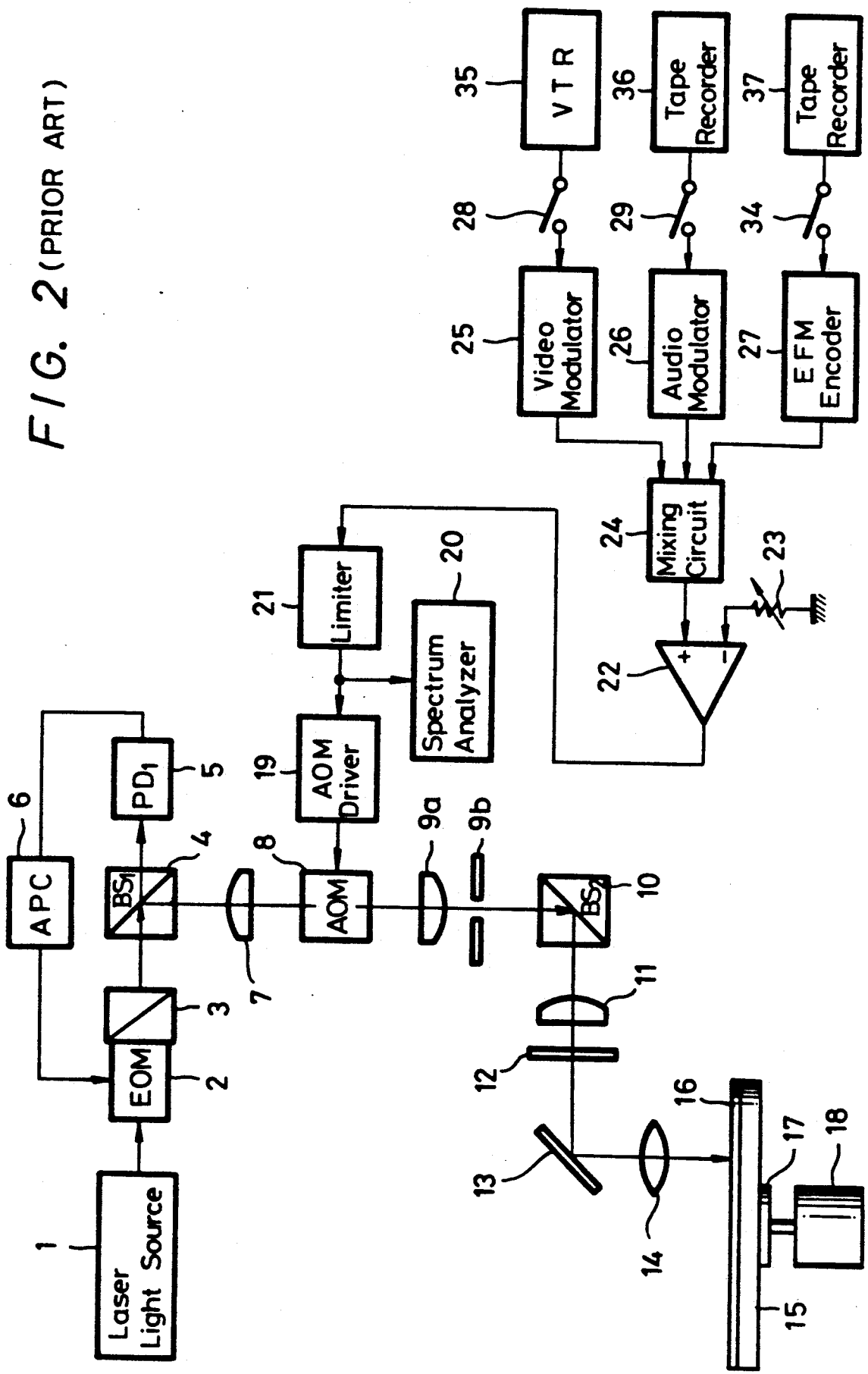
FIG. 2 is a block diagram showing an example of a prior-art cutting apparatus for an optical disc.
Figure 3:
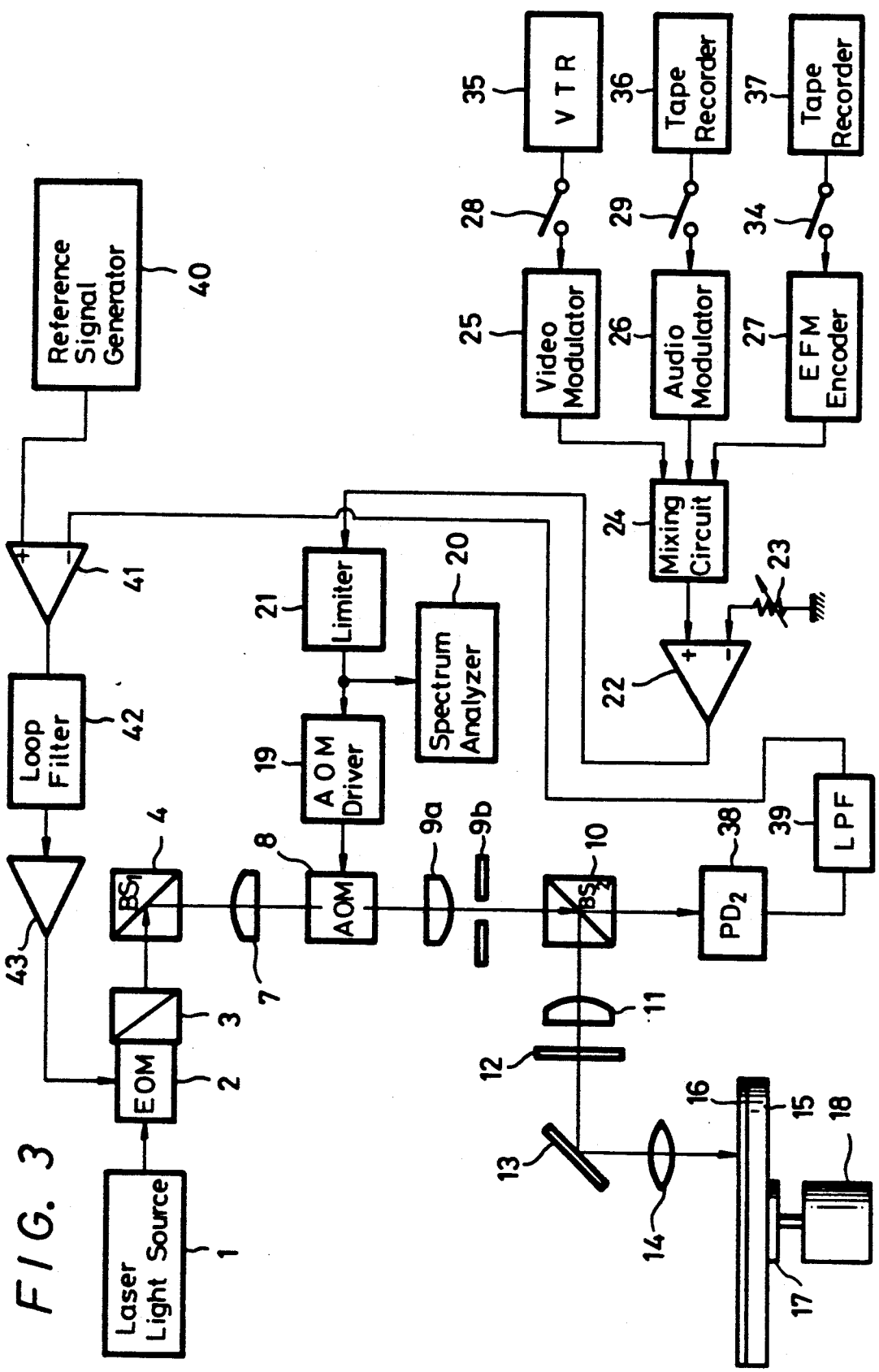
FIG. 3 is a block diagram showing a first embodiment of a cutting apparatus for an optical disc according to the present invention.

Referring to the drawings in detail, and initially to FIG. 3, let us describe a first embodiment of the cutting apparatus for an optical disc according to the present invention. In FIG. 3, like parts corresponding to those of FIG. 2 are marked with the same references and therefore need not be described in detail. More particularly, in FIG. 3, reference numerals 19 to 29 and 34 to 37 in the cutting signal system line and reference numerals 1, 2, 4 and 7 to 15 in the cutting apparatus optical system line are constructed the same as those of FIG. 2.

In this embodiment (shown in FIG. 3), the "ON"-"OFF" modulated cutting laser beam is reflected by the second beam splitter ($BS_2$) 10 or allowed to pass through the second beam splitter 10. The laser beam from the second beam splitter 10 is introduced into a second photodetector ($PD_2$) 38.

An output signal of the second photodetector 38 is converted into an electrical signal and fed to a low-pass filter (i.e., LPF) 39. The low-pass filter 39 averages the "ON"-"OFF" modulated square wave signal component to represent the cutting power of the laser beam. An output terminal of the low-pass filter 39 is connected to an inverting input terminal of a differential amplifier 41, and this differential amplifier 41 is connected at its non-inverting input terminal with an output terminal of a reference signal generator 40. The reference signal generator 40 supplies the differential amplifier 41 with command signals such as a power instructing value, discrimination of CAV disc and CLV disc or the like.

The differential amplifier 41 subtracts the power instruction value and an output signal indicative of a fluctuation of laser beam power from the low-pass filter 39. An error signal is developed at an output terminal of the differential amplifier 41 and the output terminal thereof is connected to a loop filter 42. An output terminal of the loop filter 42 is connected to a driver 43 and an output terminal of the driver 43 is connected to a crystal terminal, which changes an electric field of the EOM 2, whereby the light amount of the EOM 2 is adjusted. It is needless to say that the light amount adjusting device formed by the combination of the EOM 2 and the analyzer 3 may be replaced with the AOM.

An operation of the cutting apparatus thus constructed will be described next.

With reference to FIG. 3, the laser beam emitted from the laser light source 1 travels through the EOM 2 and the analyzer 3 and becomes incident on the first beam splitter 4, in which it is partly reflected. The laser beam reflected by the first beam splitter 4 is introduced through the lens 7 into the AOM 8.

The video signal and the first and second audio signals for cutting from the signal sources such as the video tape recorder 35 and the tape recorders 36 and 37 or the like are supplied through the respective switches 28, 29 and 34 to the video and audio modulators 25 and 26 and the EFM encoder 27, in which they are FM-modulated or PCM-modulated and then mixed by the mixing circuit 24. While being observed by the spectrum analyzer 20, the mixed signal is adjusted in offset by adjusting the variable resistor 23 of the differential amplifier 22 such that the secondary higher harmonic component of the main carrier may be minimized. An output signal amplitude-limited by the limiter 21 is supplied to the AOM driver 19 and an output signal of the AOM driver 19 is supplied to the AOM 8, whereby the laser beam from the laser light source 1 is "ON"-"OFF" modulated by the square wave signal in which the video FM wave signal is pulse width modulated by the audio FM wave signal. The modulated laser beam from the AOM 8 is introduced through the lens 9a and the aperture 9b into the second beam splitter 10, in which it is splitted to provide a reflected laser beam and a traveling laser beam. The "ON"-"OFF" modulated laser beam reflected by the second beam splitter 10 is supplied through the lens 11, the $\lambda/4$ wavelength plate 12, the mirror 13 and the objective lens 14, in that order, to the photoresist 16 coated on the master disc 15, whereby the photoresist 16 is exposed by that laser beam in response to the cutting signal. The laser beam traveled through the second beam splitter 10 is supplied to the second photodetector 38, and the "ON"-"OFF" modulated laser beam used for actual cutting work is converted into an electrical signal by the second photodetector 38.

An output electrical signal from the second photodetector 38 is a square wave which is shaped substantially as an "ON"-"OFF" condition. Nevertheless, if an optical quenching ratio of the AOM 8 or the EOM 2 is not satisfactory, then such poor optical quenching ratio appears in the "OFF" portion. If a linear characteristic of the AOM 8 is deteriorated, such condition also appears in the output. If the conversion efficiency is changed due to temperature characteristic of the AOM 8 or the like, the actual cutting power of the laser beam is thereby affected to cause the amplitude of the signal from the second photodetector 38 to be changed. As described above, the output from the second photodetector 38 reflects the condition of the actual cutting laser beam precisely. The output from the second photodetector 38 is supplied to the low-pass filter 39, in which the signal component of such output is smoothed and the low-pass filter 39 produces an output signal indicative of the power fluctuation of the cutting laser beam. This output from the low-pass filter 39 is utilized in the present invention instead of the output of the prior-art first photodetector 5 (see FIG. 2).

Command values for the power control system of the laser light source 1 are the power setting value, the descriminating value of the CAV disc and CLV disc, particularly, the radius position for the CAV disc and the linear velocity for the CLV disc from the reference signal generator 40. Then, the differential amplifier 41 derives a difference between the reference setting value and the output from the low-pass filter 39 as the error output. This error output is supplied through the loop filter 42 and the driver 43 to the EOM 2, thereby changing a voltage applied to the EOM 2. A polarizing angle of the laser beam passing through the EOM 2 is rotated by the applied voltage and the amount of laser beam is adjusted by the spectrum analyzer 3 provided at the output side of the EOM 2.

According to the first embodiment, the cutting apparatus is operated as described above, whereby the actual cutting laser beam is extracted and the power of the actual cutting laser beam is controlled to fall in a predetermined value. Therefore, even if the conversion efficiency of the AOM 8 is changed due to its temperature characteristic, such change of conversion efficiency of the AOM 8 is compensated for by changing the amount of laser beam inputted from the laser light source 1 thereto. Also, the power of the cutting laser beam can always be kept at a predetermined value and therefore the stable cutting operation can be carried out.

Figure 4:
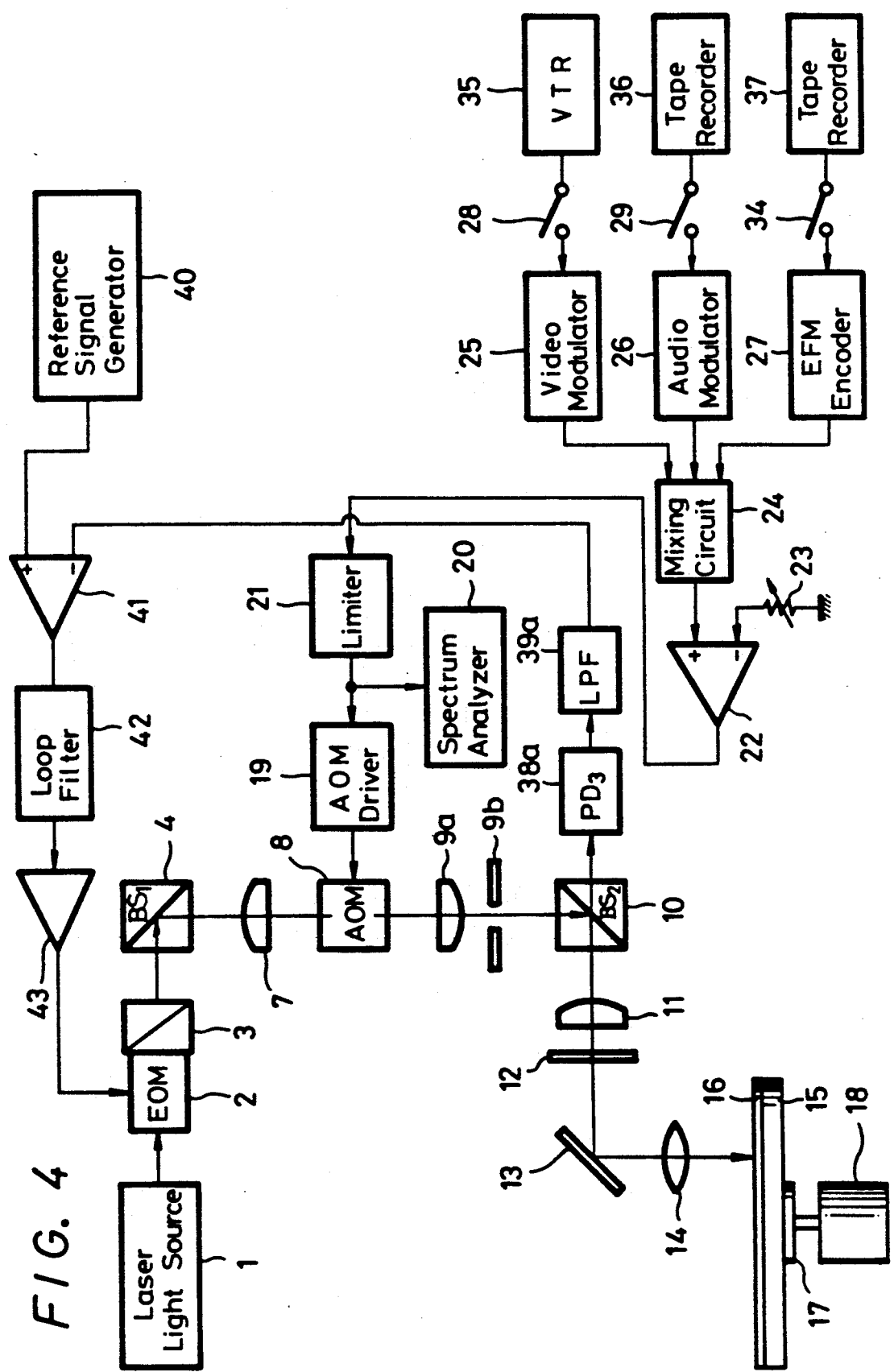
FIG. 4 is a block diagram showing a second embodiment of the cutting apparatus for an optical disc according to the present invention.

A second embodiment of the cutting apparatus for an optical disc according to the present invention will be described with reference to FIG. 4. FIG. 4 is a block diagram showing the second embodiment of the cutting apparatus according to the present invention, and to which reference will be made in explaining the way of how to control the power of the cutting laser beam similarly to FIG. 3. In FIG. 4, like parts corresponding to those of FIG. 3 are marked with the same references and therefore need not be described in detail.

Referring to FIG. 4, the "ON"-"OFF" modulated laser beam from the laser light source 1 which is reflected by the second beam splitter 10 and used in the cutting-process is further reflected on the photoresist surface 16 coated on the master disc 15. Further, the reflected laser beam traveling through the light path of the objective lens 14, the mirror 13, the λ/4 wavelength plate 12, the lens 11 and the second beam splitter 10, in that order, is received by a third photodetector 38a (i.e., PD$_3$). The output terminal of the third photodetector 38a is connected to an input terminal of a low-pass filter 39a. This low-pass filter 39a is adapted to smooth the output-signal component of the third photodetector 38a to represent the power energy of the reflected-back light of the cutting laser beam similarly to the low-pass filter 39 of FIG. 3. An output terminal of the low-pass filter 39a is connected to the inverting input terminal of the differential amplifier 41. The non-inverting input terminal of the differential amplifier 41 is connected to the reference signal generator 40 so that the reference values of the reference signal generator 40 may be fed thereto. The error signal between these signals is produced from the differential amplifier 41 and fed through the loop filter 42 and the driver 43 to the EOM 2.

According to the aforenoted arrangement, since the cutting laser beam from the third photodetector 38a is that reflected on the photoresist surface 16, such cutting laser beam contains various informations on the surface of the photoresist 16, by which the value close to the beam power in the cutting process can be obtained.

A third embodiment of the cutting apparatus for an optical disc according to the present invention will be described with reference to FIG. 5. FIG. 5 (formed of FIGS. 5A and 5B with FIG. 5A to the left of and partly overlapping FIG. 5B) shows a block diagram showing the third embodiment of the cutting apparatus according to the invention in which the pit duty of the source signal supplied to the AOM 8 is controlled. In FIG. 5, like parts corresponding to those of FIGS. 3, 4 and 2 are marked with the same references and therefore need not be described in detail.

In FIG. 5, reference numerals 1 to 18 in the cutting apparatus optical system are constructed the same as those of FIG. 2.

As shown in FIG. 5, the cutting "ON"-"OFF" modulated laser beam traveling through the second beam splitter 10 is received by the second photodetector 38. The output terminal of the second photodetector 38 is connected to the spectrum analyzer 20, and an output terminal of the spectrum analyzer 20 is connected to a microcomputer (i.e., CPU$_2$) 45. The microcomputer 45 exchanges data between it and a cutting microcomputer (i.e., CPU$_1$) 46. An output terminal of the microcomputer 45 is connected through a bus line to a control circuit 44, and switches 28, 29, 34, 47 and 48 forming a group are controlled by a control signal from the microcomputer 45. Although the switches 47 and 48 are controlled by the microcomputer 45, they are selectively turned ON or OFF depending on the situation whether or not a digital audio signal according to the CD (compact disc) format is recorded in the master disc formed, i.e., the optical disc. An output terminal of the control circuit 44 is connected to the inverting input terminal of the differential amplifier 22. This differential amplifier 22 is provided in the cutting signal system to adjust the offset.

The tape recorders 37 and 36 are respectively provided as a digital audio signal source and an analog audio signal source. The output terminals of these tape recorders 37 and 36 are respectively connected through switches 34, 47 and switches 29, 48 connected in series to input terminals of the EFM encoder 27 and the audio modulator 26. Other arrangements of the cutting signal system line are constructed the same as those of FIGS. 3 and 4 except for that the spectrum analyzer 20 is connected to the output terminal of the second photodetector 38.

Let us now describe an operation of the thus arranged third embodiment of the cutting apparatus shown in FIG. 5.

As shown in FIG. 5, the output terminal of the second photodetector 38 is connected to the spectrum analyzer 20, whereby the main carrier and the secondary higher harmonic component involved in the video signal can be observed by the spectrum analyzer 20. A ratio between the main carrier and the secondary higher harmonic component is measured by the spectrum analyer 20 and the measured result is supplied to the microcomputer 45.

Data are exchanged between the cutting CPU 46 and the CPU 45 via the bus line. When the measurement is performed, the switches 28, 29 and 34, for example, are turned "OFF" before starting the cutting-process so that the non-modulation condition is presented in which no video signal is supplied to the video modulator 25 from the video tape recorder 35. Under this condition, the main carrier and the secondary higher harmonic component are measured by the spectrum analyzer 20. Since the offset adjusting differential amplifier 22 is supplied with the control signal from the microcomputer 45 through the control circuit 44, while the main carrier and the secondary higher harmonic component are being observed by the spectrum analyzer 20, the offset is automatically adjusted in such a fashion that the secondary higher harmonic component may be minimized. Of course, if the offset is extremely displaced, this increases interactive interference between the carriers. Therefore, it is necessary to limit the adjusting range to the very small range.

According to the third embodiment of the present invention, since the pit duty is controlled by the "ON"-"OFF" modulated laser beam, the characteristic of the AOM 8 can be compensated for simultaneously and the pit duty can be always kept optimized stably. Thus, it is possible to obtain the cutting apparatus which can avoid the deterioration of quality such as the occurrence of moiré caused by the increase of interferences between the carriers due to the displacement of pit duty.

Figure 6B:
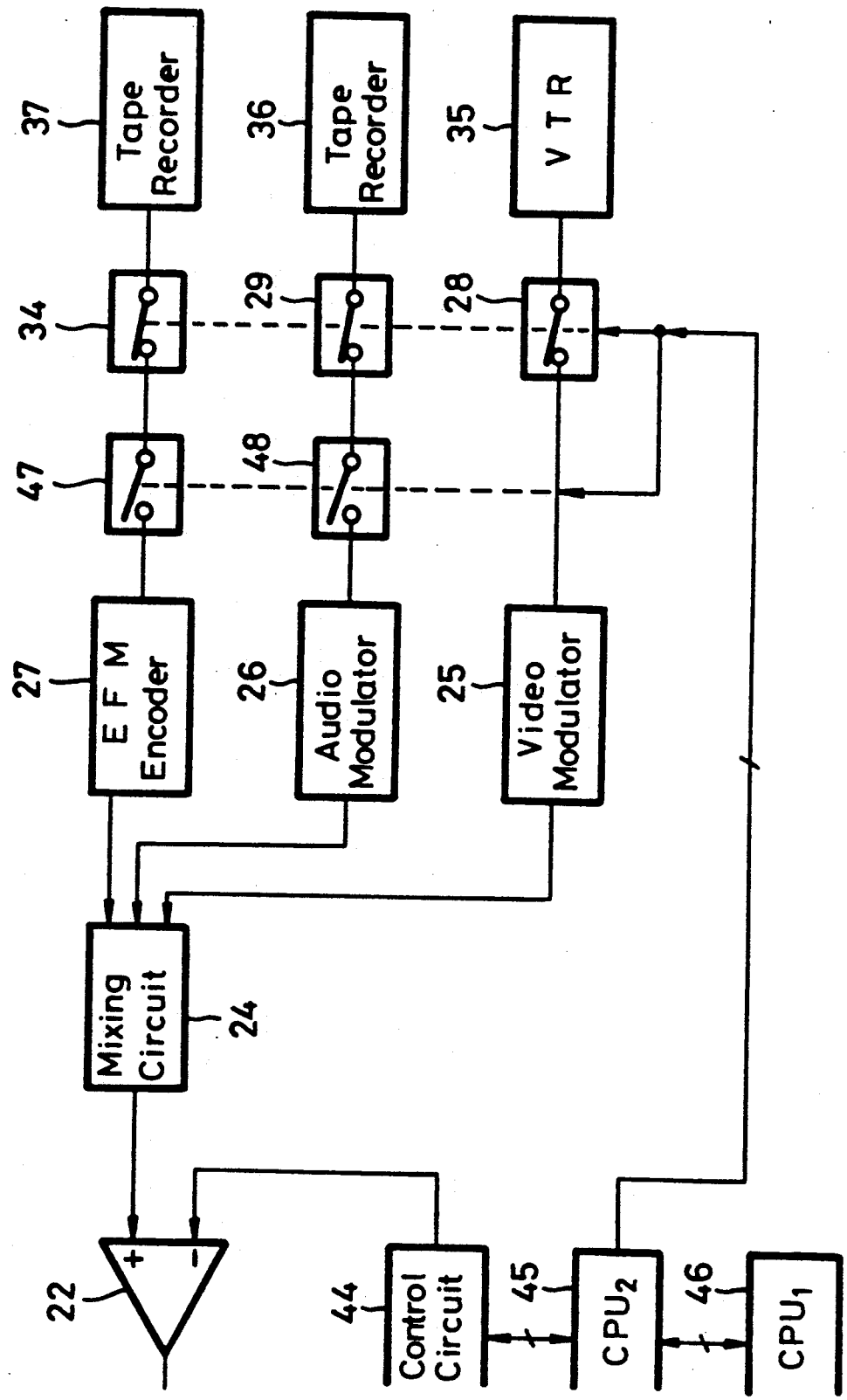

A fourth embodiment of the cutting apparatus for an optical disc according to the present invention will be described with reference to FIG. 6. FIG. 6 (formed of FIGS. 6A and 6B with FIG. 6A to the left of and partly overlapping FIG. 6B) shows a systematic diagram showing the fourth embodiment of the cutting apparatus of the invention in which the pit duty is controlled similarly to FIG. 5. In FIG. 6, like parts corresponding to those of FIG. 5 are marked with the same references and therefore need not be described in detail.

As shown in FIG. 6, the cutting laser beam emitted from the laser light source 1 and reflected by the second beam splitter 10 is reflected on the surface of the photoresist 16, traveled through the return light path whose advancing direction is just opposite to the former light path, passed through the beam splitter 10 and is then introduced into the third photodetector 38a. The laser beam received by the third photodetector 38a is supplied to the spectrum analyzer 20.

According to the arrangement of the fourth embodiment, since the pit duty is controlled by the "ON"-"OFF" modulated and reflected laser beam reflected on the surface of the photoresist 16 coated on the master disc 15, the characteristic of the AOM 8 and the characteristic of the photoresist 16 coated on the master disc 15 upon exposure can be both compensated for, thus the pit duty being controlled in the form closer to the cutting characteristic.

Figure 7B:
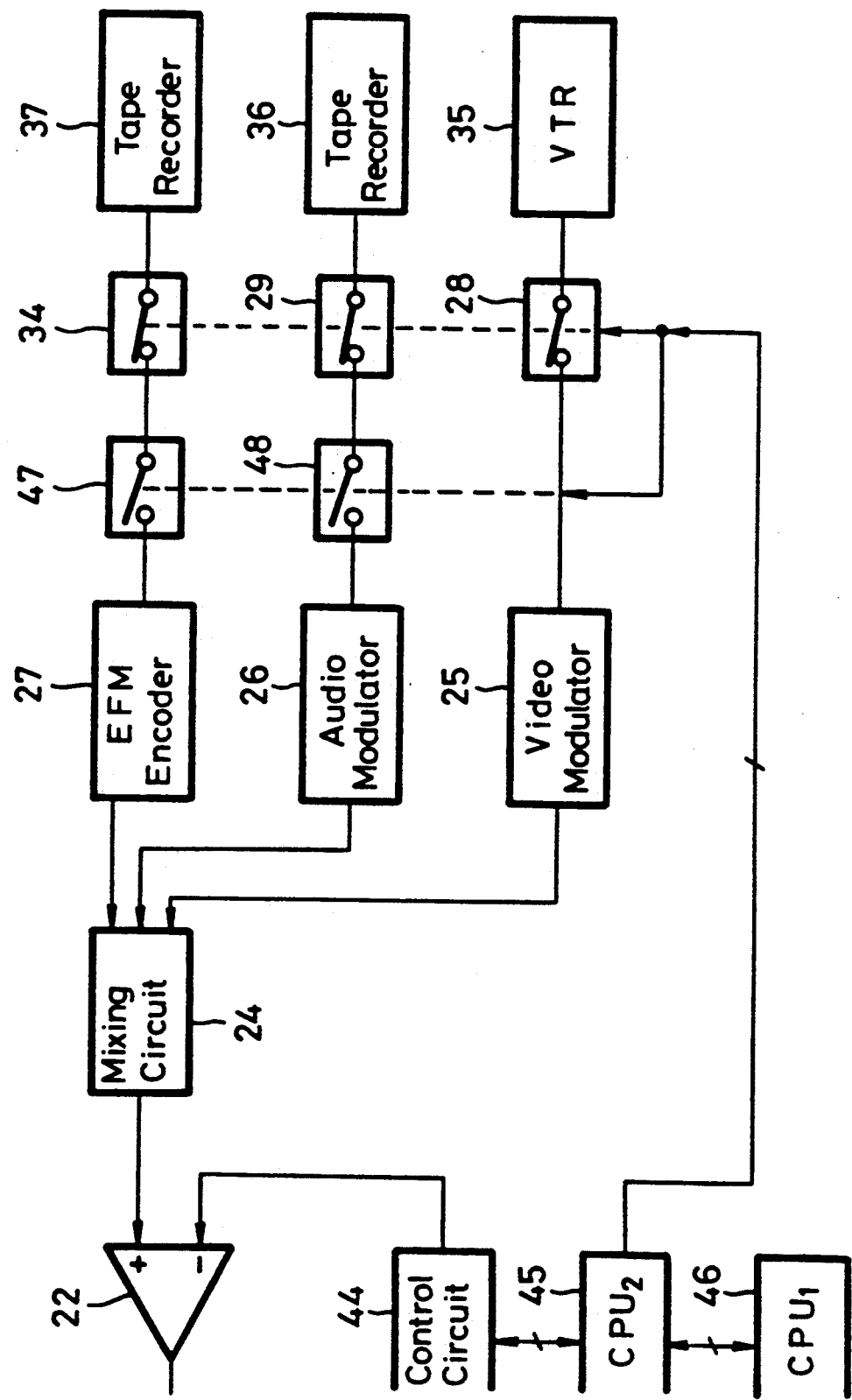
Figure 8B:
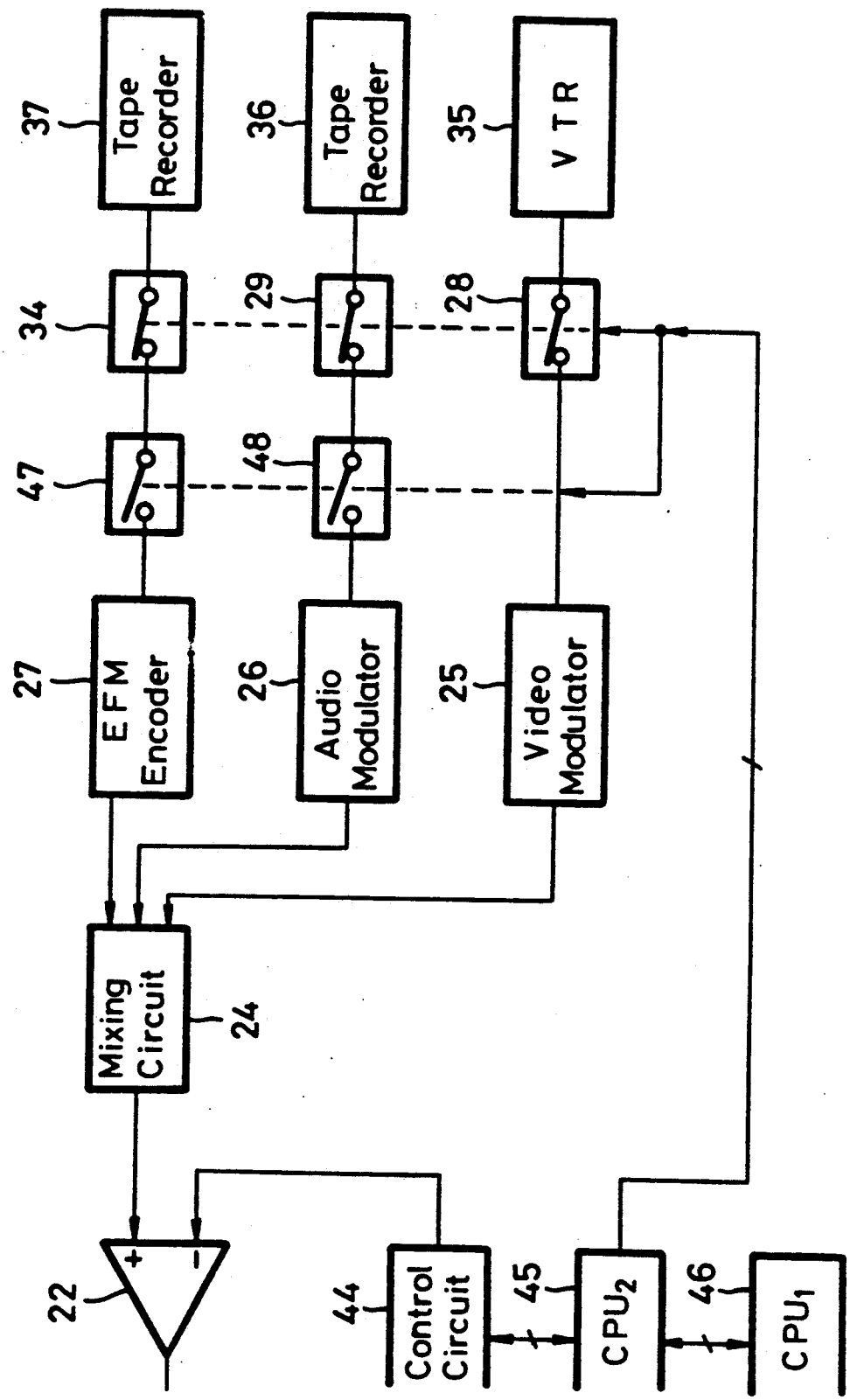

Fifth and sixth embodiments of the cutting apparatus for an optical disc according to the present invention will be described with reference to FIGS. 7 and 8. FIGS. 7 and 8 (formed of FIGS. 7A, 7B and FIGS. 8A, 8B) are respectively systematic diagrams showing the fifth and sixth embodiments of the cutting apparatus according to the present invention in which the pit duty can be controlled similarly to those of FIGS. 5 and 6. The output of the second photodetector 38 or 38a is supplied to the low-pass filter 39 or 39a and the output of the low-pass filter 39 or 39a is used to adjust the pit duty. Other arrangements of FIGS. 7 and 8 are the same as those of FIGS. 5 and 6.

In the arrangement of FIG. 7 or FIG. 8, the spectrum analyzer 3 is used to determine the magnitude of the output of the low-pass filter 39 or 39a in the continuous "ON" state for minimizing the secondary higher harmonic component. Then, the output is adjusted so as to become the previously-detected value. This adjustment may be automatically performed by the microcomputer 45 or in a manual fashion.

Further, the output of the low-pass filter 39 or 39a is not limited to the above-mentioned predetermined value and may be intentionally changed in order to obtain a desired pit duty.

According to the above-mentioned arrangements, the pit duty can be controlled stably and in the optimum condition.

Figure 9B:
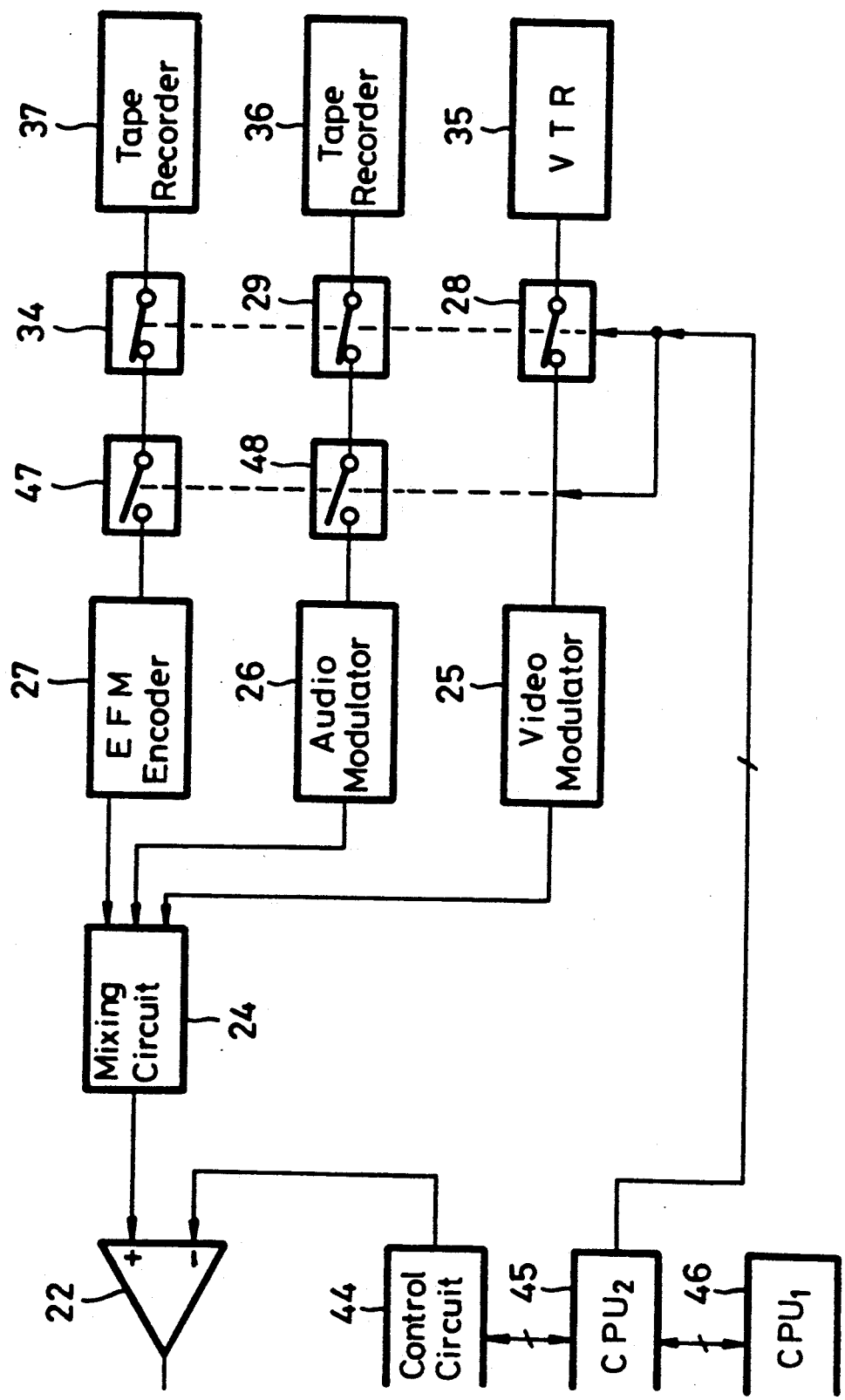

A seventh embodiment of the cutting apparatus for an optical disc according to the present invention will be described with reference to FIG. 9. FIG. 9 (formed of FIGS. 9A and 9B with FIG. 9A to the left of and partly overlapping FIG. 9A) is a block diagram showing the seventh embodiment of the cutting apparatus of this invention in which the power of the cutting laser beam is controlled by the second photodetector 38 shown in FIG. 3 and in which the above-mentioned control system is combined with the pit duty control system shown in FIG. 5. The above control operation is similar to those of FIGS. 3 and 5 and therefore need not be described.

Alternatively, similarly to FIG. 9, the third photodetector 38a shown in FIG. 4 may be combined with the arrangement shown in FIG. 6 or the arrangements shown in FIGS. 3 and 7 may be combined together and the arrangements shown in FIGS. 4 and 8 may be combined together. Further, by using the second photodetector 38 and the third photodetector 38a, it is possible to combine the arrangements of FIGS. 3 and 6, the arrangements of FIGS. 3 and 8, the arrangements of FIGS. 4 and 5 and the arrangements of FIGS. 4 and 7, respectively.

According to the above-mentioned arrangements, the power of the cutting laser beam and the pit duty can be controlled simultaneously.

According to the cutting apparatus for an optical disc of the present invention, regardless of the fluctuation of the AOM, temperature characteristis and aging change, the power of the cutting laser beam is controlled so as to compensate for the temperature characteristic, the aging change and so on, whereby the uniform and stable cutting operation can always be effected.

Furthermore, according to the present invention, since the pit duty can be controlled by the "ON"-"OFF" modulated laser beam which performs the cutting, it is possible to maintain the pit duty to be cut in the stable and optimum condition at all times.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A cutting apparatus in which a recording laser beam from a laser light source is used to form exposure pits on a master disc, wherein said recording laser beam travels along a light path from said laser light source through a modulator and to said master disc, said cutting apparatus comprising:
   a photodetector operatively positioned for receiving a portion of said recording laser beam;
   means operatively positioned in said light path between said modulator and said master disc for passing at least a first portion of said recording laser beam to said master disc along said light path and for passing a second portion of said recording laser beam to said photodetector;
   a low-pass filter responsive to an output signal from said photodetector; and
   control means responsive to said low-pass filter for controlling intensity of said laser beam emitted from said laser light source.

2. The cutting apparatus as cited in claim 1, wherein said control means includes light amount adjusting means for adjusting an amount of said laser beam emitted form said laser light source and said light amount adjusting means is controlled on the basis of a detected output from said photodetector.

3. The cutting apparatus as cited in claim 2, wherein said control means includes reference signal generating means for generating a reference signal matched with the kind of discs to be cut such as power instructing value of said laser light source or the like and said control means controls said light amount adjusting means on the basis of the reference signal from said reference signal generating means and the detected output from said photodetector.

4. The cutting apparatus as cited in claim 2, wherein said control means includes reference signal generating means for generating a reference signal matched with the kind of discs to be cut such as power instructing value of said laser light source or the like and said control means controls said light amount adjusting means on the basis of the reference signal from said reference signal generating means and the detected output from said photodetector.

5. The cutting apparatus of claim 1 wherein said recording laser beam is turned OF/OFF by a square wave output signal in which a video FM wave signal is pulse width modulated by an audio FM wave signal.

6. A cutting apparatus in which a recording laser beam from a laser light source is used to form exposure pits on a master disc, wherein said laser beam travels along a light path from said laser light source through a modulator and to said master disc, said cutting apparatus comprising:
   a photodetector for receiving a portion of said recording laser beam;
   means operatively positioned in said light path between said modulator and said master disc for passing at least a first portion of said recording laser beam to said master disc along said light path and for passing a second portion of said recording laser beam to a photodetector, wherein said second portion is reflected by said master disc to said photodetector;
   a low-pass filter operatively connected to receive an output signal from said photodetector; and
   control means responsive to said low-pass filter for controlling intensity of said recording laser beam.

7. The cutting apparatus as cited in claim 6, wherein said control means includes light amount adjusting means for adjusting an amount of the laser beam emitted from said laser light source and said control means controls said light amount adjusting means on the basis of a detected output from said photodetector.

8. The cutting apparatus of claim 6 wherein said recording laser beam is turned ON/OFF by a square wave output signal in which a video FM wave signal is pulse width modulated by an audio FM wave signal.

9. A cutting apparatus in which exposure pits are formed on a master disc by a recording laser beam from a laser light source, said cutting apparatus comprising:
   a photodetector operatively positioned for receiving one portion of said recording laser beams; and
   adjusting means responsive to said photodetector for adjusting an offset amount of a source modulating system line such that a secondary higher harmonic component of a main carrier in an FM video carrier signal contained in the output signal from said photodetector is minimized.

10. The apparatus of claim 9 wherein an optical modulating means turns said recording laser beam OF/OFF by a square wave output signal in which a video FM wave signal is pulse width modulated by an audio FM wave signal.

11. The cutting apparatus as cited in claim 9, wherein said adjusting means adjusts the offset amount of said source modulating system line so that said secondary higher harmonic component is minimized under the condition that said optical modulating means is in its non-modulation state.

12. The cutting apparatus as cited in claim 9, wherein said adjusting means adjusts the offset of said source system line while observing the detected output of said photodetector by a spectrum analyzer.

13. The cutting apparatus as cited in claim 9, wherein said adjusting means adjusts the offset of said source system line by using an output signal which results from processing the detected output of said photodetector by a low-pass filter.

14. The cutting apparatus as cited in claim 9, further comprising a low-pass filter operatively connected to receive an output signal from said photodetector; and
   control means operatively connected to receive a signal from said low-pass filter for controlling an intensity of the recording laser beam.

15. The cutting apparatus as cited in claim 14, wherein said control means includes light amount adjusting means for adjusting a light amount of the output laser beam from said laser light source and controls said light amount adjusting means on the basis of the detected output from said photodetector.

16. The cutting apparatus as cited in claim 14, wherein said control means includes reference signal generating means for generating a reference signal such as a power instructing value of said laser light source or the like matched with the kind of a disc to be cut and controls said light amount adjusting means on the basis of the reference signal from said reference signal generating means and the detected output from said photodetector.

17. A cutting apparatus in which exposure pits are formed on a master disc by a recording laser beam from a laser light source, said cutting apparatus comprising:
   a photodetector operatively positioned for receiving a portion of said recording laser beam which is irradiated on said master disc from said laser light source and which is reflected by said master disc; and
   adjusting means responsive to said photodetector for adjusting an offset of a source modulating system line so that a secondary higher harmonic component of a main carrier in an FM carrier signal in the output signal from said photodetector is minimized.

18. The apparatus of claim 17 wherein an optical modulating means turns said recording laser beam ON/OFF by a square wave output signal in which a video FM wave signal is pulse width modulated by an audio FM wave signal.

19. The cutting apparatus as cited in claim 17, wherein said adjusting means adjusts the offset of said source modulating system line so that said secondary higher harmonic component is minimized under the condition that said optical modulating means is in its non-modulation state.

20. The cutting apparatus as cited in claim 17, wherein said adjusting means adjusts the offset of said source modulating system line so that a secondary higher harmonic component in the detected output from said photodetector is minimized under the condition that said optical modulating means is in its non-modulation state.

21. The cutting apparatus as cited in claim 20, wherein said adjusting means adjusts the offset of said source modulating system line while observing the detected output of said photodetector by a spectrum analyzer.

22. The cutting apparatus as cited in claim 17, wherein said adjusting means adjusts the offset of said source modulating system line by using an output signal which results from processing the detected output from said photodetector by a low-pass filter.

23. The cutting apparatus according to claim 17, further comprising a low-pass filter operatively connected to receive an output signal from said photodetector and control means operatively connected to receive a signal from said low-pass filter for controlling an intensity of said recording laser beam.

24. The cutting apparatus as cited in claim 23, wherein said control means includes light amount adjusting means for adjusting a light amount of the output laser beam from said laser light source and controls said light amount adjusting means on the basis of the detected output from said photodetector.

25. The cutting apparatus as cited in claim 24, wherein said control means includes reference signal generating means for generating a reference signal such as a power instructing value of said laser light source or the like matched with the kind of a disc to be cut and controls said light amount adjusting means on the basis of the reference signal from said reference signal generating means and the detected output from said photodetector.

* * * * *